(12) United States Patent
Matsuoka

(10) Patent No.: US 8,398,156 B2
(45) Date of Patent: Mar. 19, 2013

(54) DAMPER MOUNTING STRUCTURE

(75) Inventor: Kiyohiko Matsuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 13/161,804

(22) Filed: Jun. 16, 2011

(65) Prior Publication Data

US 2011/0316308 A1    Dec. 29, 2011

(30) Foreign Application Priority Data

Jun. 28, 2010 (JP) .................. 2010-146069

(51) Int. Cl.
*B62D 25/08* (2006.01)
(52) U.S. Cl. ..................................... 296/192
(58) Field of Classification Search .................. 296/192; 280/124.166
See application file for complete search history.

(56) References Cited

U.S. PATENT DOCUMENTS

2005/0067858 A1  3/2005  Suh et al.
2006/0027993 A1  2/2006  Takayanagi et al.
2007/0246971 A1  10/2007 Hanakawa et al.

FOREIGN PATENT DOCUMENTS

| EP | 2033879 A1 | 3/2009 |
| JP | 2006-240463 | 9/2006 |
| JP | 2006-327445 | 12/2006 |
| JP | 2007-284008 | 11/2007 |

*Primary Examiner* — Lori Lyjak
(74) *Attorney, Agent, or Firm* — Rankin, Hill & Clark LLP

(57) ABSTRACT

In a damper mounting structure provided at each lateral end of a vehicle body to support an upper end of a wheel suspension damper, a dash upper panel (1) and a cross member (2) jointly form a laterally extending member that supports upper ends of vehicle suspension dampers (5) at either lateral end thereof. The cross member (2) includes a main body welded to an upper surface of the dash upper panel (1) via a pair of lateral flanges (5a) thereof extending along either side thereof, and a half bowl-shaped portion (9) formed on each end thereof and welded to a periphery of the corresponding damper mounting portion via a peripheral flange (9d) formed along an outer periphery of the half bowl-shaped portion (9). The peripheral flange (9d) is provided with a pair of cutouts (2b) that expose two of the threaded bolts (7). The cross member is further provided with an opening (10) for exposing the third threaded bolt.

3 Claims, 4 Drawing Sheets

DAMPER MOUNTING STRUCTURE

TECHNICAL FIELD

The present invention relates to a damper mounting structure provided at each lateral end of a dash upper panel extending laterally across a vehicle body to support an upper end of a wheel suspension system.

BACKGROUND OF THE INVENTION

Conventionally, when a strut type wheel suspension system is used, a damper is received in a damper housing formed in the vehicle body so as to have an open end facing downward. A damper base consisting of a plate member and formed with a plurality of mounting holes is welded to an upper closed end of the damper housing from above. Threaded bolts extending upward from the upper end of the damper are passed through the mounting holes, and nuts are threaded onto the bolts so as to secure the upper end of the damper to the vehicle body.

In such a damper mounting structure, as the left and right damper bases are individually attached to the corresponding parts, the positional precisions of the damper bases or the upper ends of the dampers may differ from each other, and this complicates the adjustment of the geometry of the right and left wheel suspension systems. To overcome this problem, it has been proposed to extend a dash upper panel to the upper surfaces of the damper bases, and weld a cross member extending short of the damper bases to the dash upper panel so as to jointly define a closed cross section. See JP 2006-327445A (patent document 1), for instance.

According to the invention disclosed in patent document 1, because the dash upper panel is reinforced by the cross member, and extends adjacent to the damper bases, the dash upper panel can be reinforced, and the mounting precision of the upper end of the damper can be improved.

However, according to this prior art, the cross member cannot be extended up to the main part of the damper bases because the threaded bolts for securing the upper end of the damper to the damper base would interfere with the end part of the cross member if that were the case. Therefore, this prior art is only a partial solution to this problem.

BRIEF SUMMARY OF THE INVENTION

In view of such a problem of the prior art, a primary object of the present invention is to provide a damper mounting structure that demonstrates a high stiffness without complicating the structure or the assembly work.

A second object of the present invention is to provide a damper mounting structure that can support an upper end of a damper at a high dimensional precision.

To achieve such objects, the present invention provides a damper mounting structure, comprising: a dash upper panel (1) extending laterally across a vehicle body; a damper mounting portion formed in each lateral end of the dash upper panel (1), the damper mounting portion including a plurality of mounting holes (8a) for receiving a plurality of threaded bolts (7) for securing an upper end of a suspension damper; and a cross member (2) attached to an upper surface of the dash upper panel (1), the cross member (2) including a main body welded to an upper surface of the dash upper panel (1) via a pair of lateral flanges thereof extending along either side thereof, and a half bowl-shaped portion (9) formed on each lateral end thereof and welded to a periphery of the corresponding damper mounting portion via a peripheral flange (9d) formed along an outer periphery of the half bowl-shaped portion (9); wherein the peripheral flange (9d) is provided with at least one cutout (2b) that exposes one of the threaded bolts (7).

Thereby, the cross member is allowed to extend substantially over the entire length of the dash upper panel, and increase the stiffness and mechanical strength of the assembly consisting of the dash upper panel and cross member while ensuring a favorable access to the threaded bolts.

A circumferential step (9b) may be formed between the peripheral flange (9d) and the half bowl-shaped portion (9) so that an adequate stiffness and mechanical strength may be ensured to the half bowl-shaped portion in spite of the provision of the cutout. According to a preferred embodiment of the present invention, a flat portion (9a) is formed at a top of the half bowl-shaped portion (9), and an opening (9c) is formed in the flat portion (9a). Thereby, an adequate stiffness and mechanical strength may be afforded to the half bowl-shaped portion by the flat portion, and the opening allows the electro-painting liquid that may be trapped in the space defined between the cross member and upper dash panel to be drained.

According to a particularly preferred embodiment of the present invention, the damper mounting portion includes three mounting holes for receiving three threaded bolts, and the peripheral flange (9d) is provided with a pair of cutouts (2b) that expose two of the threaded bolts, an opening (10) being formed in a part of the cross member (2) intermediate between each half bowl-shaped portion and the main body of the cross member for exposing the third threaded bolt.

The main body of the cross member may define a closed cross section in cooperation with the dash upper panel such that a cross sectional area of the closed cross section is greater in a laterally middle part of the cross member than in each lateral end part thereof. Thereby, the stiffness and mechanical strength of the assembly may be efficiently improved, and the internal space defined in the laterally middle part of the assembly may be conveniently used for receiving equipment and/or component parts.

DETAILED DESCRIPTION OF THE PREFERRED EMBODIMENT(S)

Figure 1:
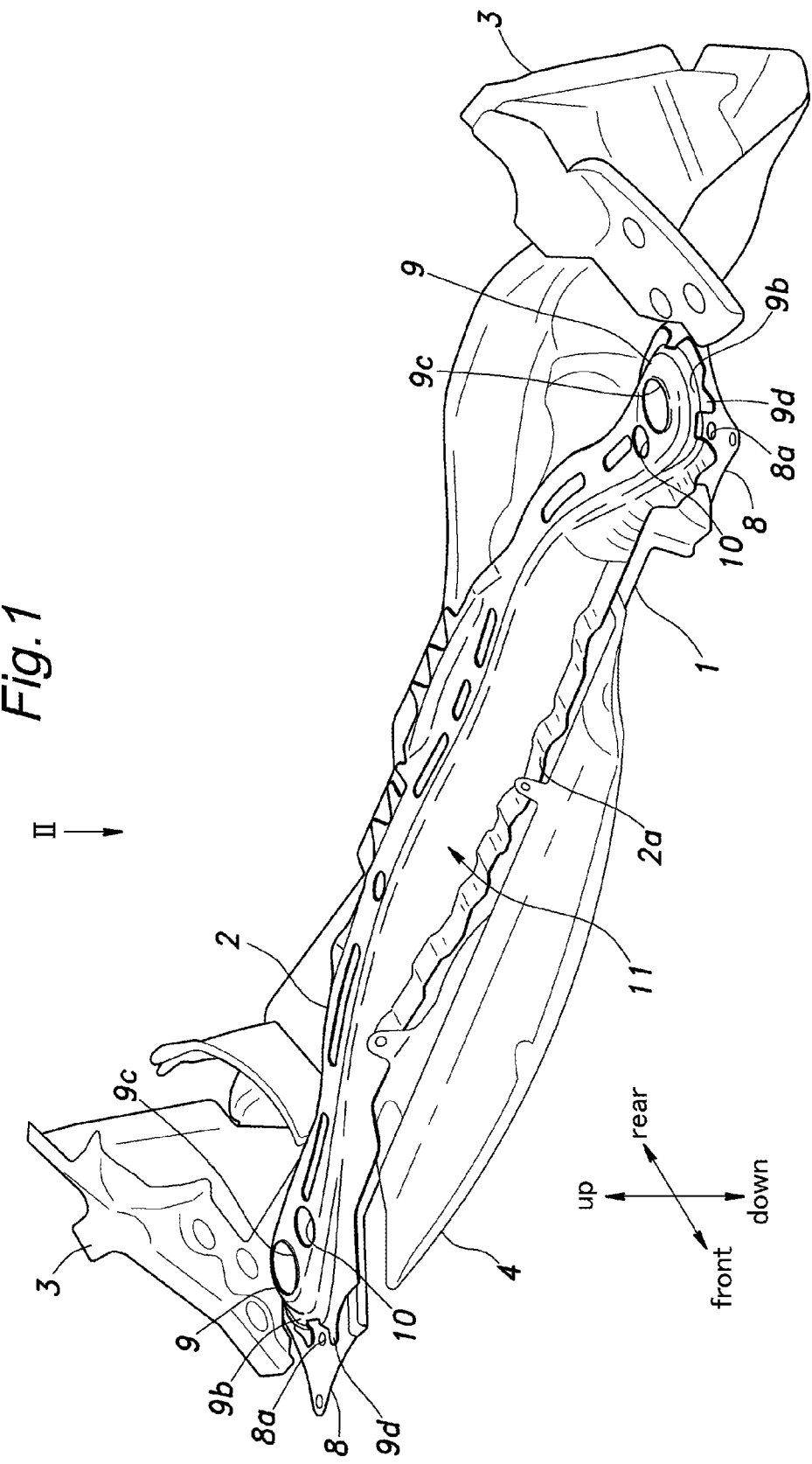
FIG. 1 is a fragmentary perspective view illustrating the main part of a damper mounting structure embodying the present invention.
Figure 2:
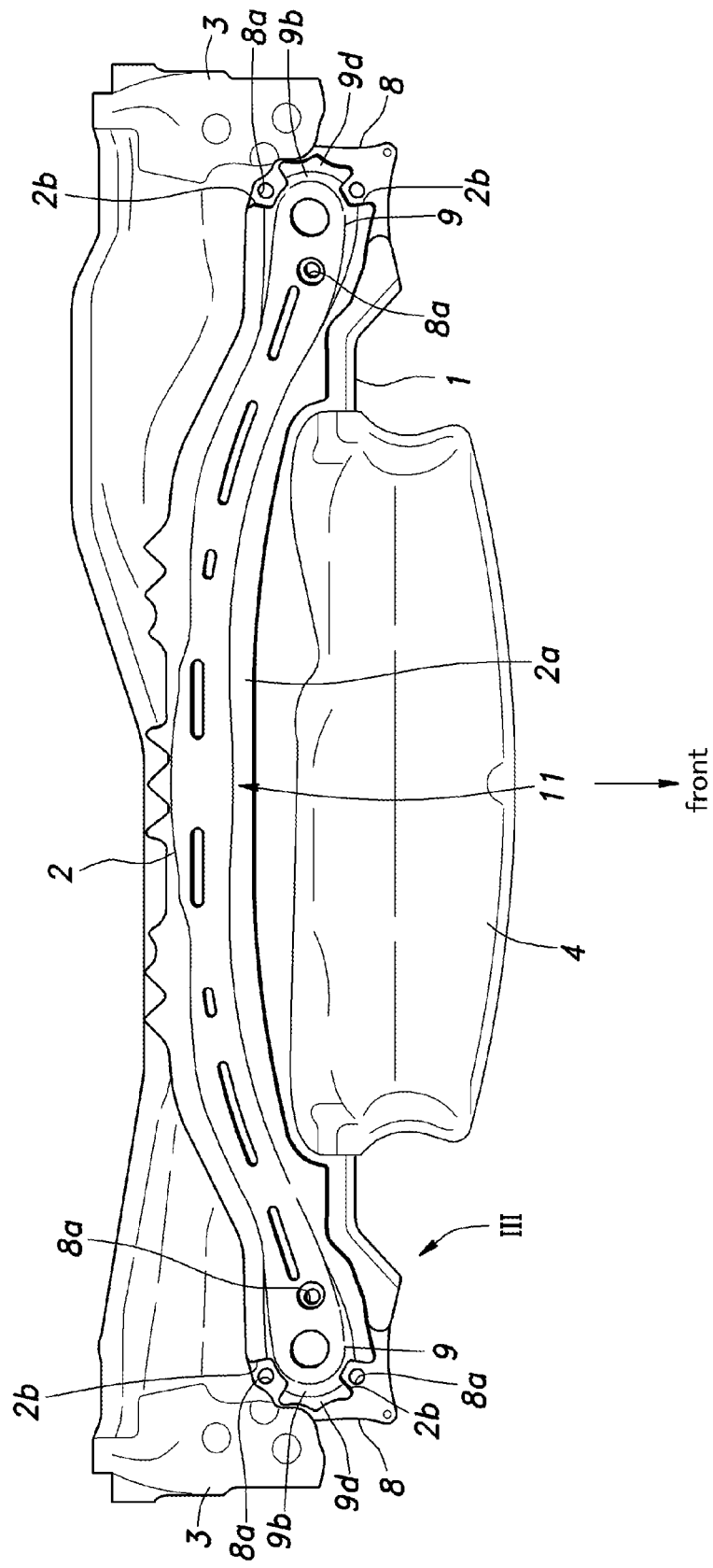
FIG. 2 is a plan view of the damper mounting structure when viewed from arrow II of FIG. 1.

A preferred embodiment of the invention will now be described in the following with reference to the appended drawings. FIG. 1 is a fragmentary perspective view illustrating the main part of a damper mounting structure embodying the present invention, and FIG. 2 is a plan view of the damper mounting structure when viewed from arrow II of FIG. 1. Unless otherwise specifically noted in the following description, various parts of this embodiments consist of stamp formed steel plate members which are spot welded to one another so as to form an integral assembly.

The vehicle cowl part illustrated in FIGS. 1 and 2 comprises a dash upper panel 1 extending laterally across a vehicle body, a cross member 2 extending substantially over the entire lateral extent of the dash upper panel 1 and welded to the upper surface thereof, and a pair of cowl sides 3 each welded to the corresponding end of the dash upper panel 1. A dash upper lid member 4 which has a smaller lateral extent than the dash upper panel 1 is attached to a front end of the dash upper panel 1 by using screws or other fasteners. A window shield lower panel not shown in the drawings is placed on top of the dash upper panel 1 and cross member 2.

Figure 3:
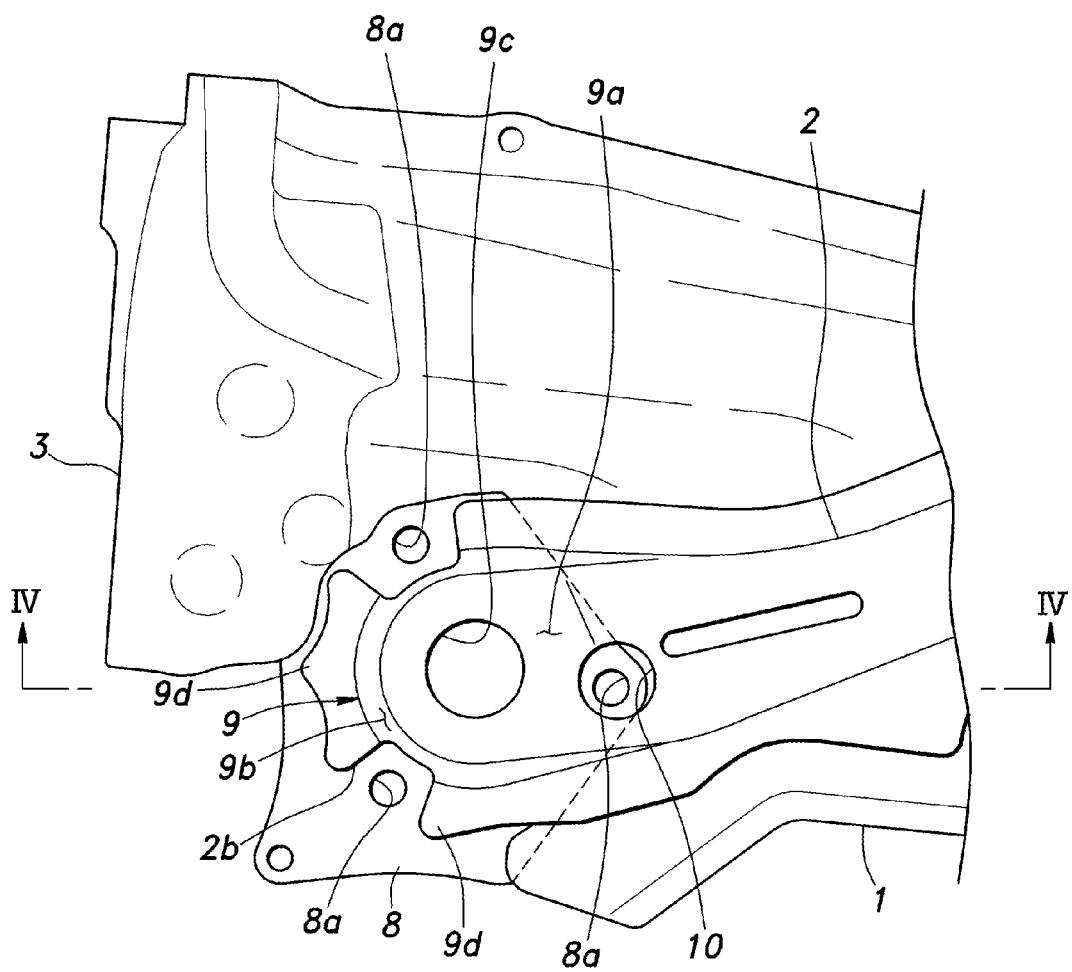
FIG. 3 is a fragmentary plan view of the main part of the damper mounting structure indicated by arrow III of FIG. 2; and, FIG. 4 is a cross sectional view taken along line IV-IV of FIG. 3.
Figure 4:
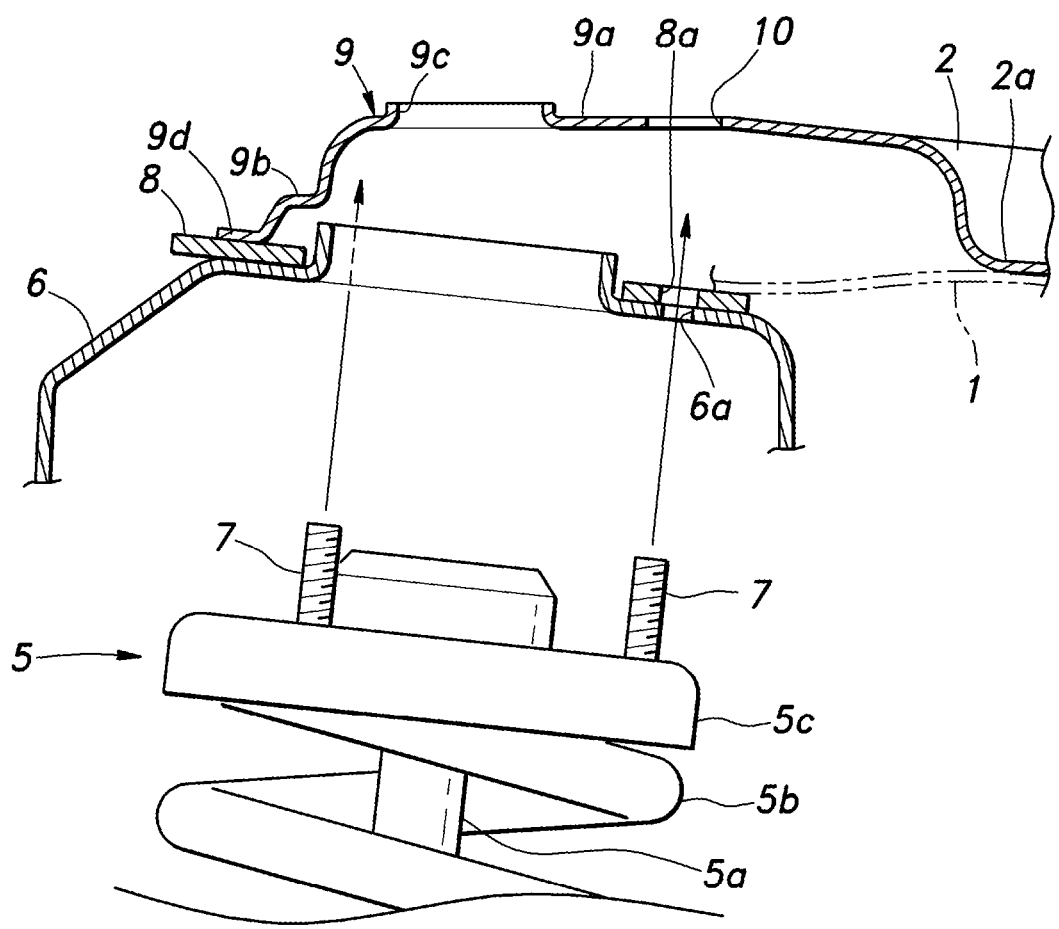

FIG. 3 is a fragmentary plan view of the main part of the damper mounting structure indicated by arrow III in FIG. 2, and FIG. 4 is a cross sectional view taken along line IV-IV of FIG. 3. The main part of the cross member 2 is provided with a hat-shaped cross section including an inverted cup-shaped section and a pair of flanges 2a extending from either side edge of the cup-shaped section away from each other. A damper housing 6 for receiving a damper or a strut 5 is attached to the lower side of each lateral end of the dash upper panel 1.

The illustrated strut 5 includes a damper 5a and a spring 5b coaxially combined with each other, and is provided with a disc-shaped upper mount 5c. Three threaded bolts 7 project from the upper side of the upper mount 5c and pass through corresponding mounting holes 6a provided in the upper end of the damper housing 6.

A damper base plate 8 (damper mounting portion) having a greater thickness than the dash upper panel 1 is fixedly attached to the lateral ends of the dash upper panel 1 so as to cover the upper side of the upper part of the damper housing 6. The damper base plate 8 is provided with three mounting holes 8a corresponding to the mounting holes 6a. Nuts not shown in the drawing are threaded onto the threaded bolts 7 that are passed through mounting holes 6a and 8a to secure the upper mount 5c to the upper part of the damper housing 6.

Each lateral end of the cross member 2 is provided with a half bowl-shaped portion 9 that overlies the upper surface of the damper base plate 8. The half bowl-shaped portion 9 is provided with a peripheral flange 9d. The parts of the peripheral flange 9d corresponding to two of the damper mounting holes 8a are cut out (cutout portions 2b) to expose the damper mounting holes 8a or the threaded bolts 7. This allows the threaded bolts 7 to be passed through the mounting holes 8a and threaded with the nuts without being interfered by the peripheral flange 9d.

The cross member 2 is also fixedly attached to the dash upper panel 1 by spot welding at a plurality of points arranged along the flanges 2a and peripheral flanges 9d. Each peripheral flange 9d is separated into three parts by the cutout portions 2b. The half bowl-shaped portion 9 is provided with a step 9b extending circumferentially between the upper part 9a of the half bowl-shaped portion 9 and the peripheral flange 9d. Each cutout portion 2b extends into the step 9b (shoulder surface). This step 9b increases the stiffness of the half bowl-shaped portion 9 so as to make up for the provision of the cutout portions 2b. Alternatively, each cutout portion 2b may be confined within the peripheral flange 9d, and extend short of the step 9b.

The part intermediate between the half bowl-shaped portion 9 and the main part of the cross member 2 is provided with an opening 10 to afford excess to the third mounting hole 8a.

The upper part 9a of the half bowl-shaped portion 9 is given with a planar-shape, and is formed with an opening 9c for draining liquid during the electro-painting process. This opening 9c allows the electro-painting liquid that may be trapped between dash upper panel 1 and cross member 2 during the electro-painting process to be drained. The opening 9c may be formed with an axial flange at the same time as forming the opening 9c so that the stiffness of the end part of the cross member 2 may be increased. Thereby, the cross member 2 may be given with a high stiffness and mechanical strength over the entire length.

The base plate 8 used for securing the upper end of the strut 5 is made of a thick steel plate so that the stiffness of the upper mounting point of the strut may be increased.

A laterally middle part 11 of the cross member 2 is given with a greater cross-sectional area than each end thereof as shown in FIG. 2. In the illustrated embodiment of the laterally middle part 11 of the dash upper panel 1 upwardly bulges or is upwardly recessed. By thus enlarging the closed-section defined by the dash upper panel 1 and cross member 2 in the laterally middle part of the assembly thereof, not only the mechanical strength and stiffness can be increased but also a space for receiving a windshield wiper device or other components may be defined in the middle part of the assembly.

This closed-cross section is substantially rectangular, and defines a pair of ridged lines along either side end that connected to the two half bowl-shaped portions 9 so that the assembly (combining the dash upper panel 1 and cross member 2) is given with a high mechanical strength and stiffness over the entire length thereof.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of the prior art references mentioned in this application are incorporated in this application by reference.

The invention claimed is:

1. A damper mounting structure, comprising:
 a dash upper panel extending laterally across a vehicle body;
 a damper mounting portion formed in each lateral end of the dash upper panel, the damper mounting portion including three mounting holes for receiving a corresponding number of threaded bolts for securing an upper end of a suspension damper; and
 a cross member attached to an upper surface of the dash upper panel, the cross member including a main body welded to an upper surface of the dash upper panel via a pair of lateral flanges thereof extending along either side thereof, and a bowl-shaped portion formed on each lateral end thereof and welded to a periphery of the corresponding damper mounting portion via a peripheral flange formed along an outer periphery of the bowl-shaped portion;
 wherein the peripheral flange is provided with a pair of cutouts that expose two of the threaded bolts, an opening being formed in a part of the cross member intermediate each bowl-shaped portion and the main body of the cross member for exposing the third threaded bolt; and
 wherein a circumferential step is formed between the peripheral flange and the bowl-shaped portion, each cutout extending into the circumferential step.

2. The damper mounting structure according to claim 1, wherein a flat portion is formed at a top of the half bowl-shaped portion, and an opening is formed in the flat portion.

3. The damper mounting structure according to claim 1, wherein the main body of the cross member defines a closed cross section in cooperation with the dash upper panel, and a cross sectional area of the closed cross section is greater in a laterally middle part of the cross member than in each lateral end part thereof.

* * * * *